(12) United States Patent
Nagai et al.

(10) Patent No.: US 8,918,646 B2
(45) Date of Patent: *Dec. 23, 2014

(54) DATA PROCESSING APPARATUS

(75) Inventors: Yasushi Nagai, Fujisawa (JP); Hiroshi Nakagoe, Yokohama (JP); Shigeki Taira, Yokohama (JP)

(73) Assignee: Renesas Electronics Corporation, Kanagawa (JP)

( * ) Notice: Subject to any disclaimer, the term of this patent is extended or adjusted under 35 U.S.C. 154(b) by 341 days.

This patent is subject to a terminal disclaimer.

(21) Appl. No.: 13/456,630

(22) Filed: Apr. 26, 2012

(65) Prior Publication Data

US 2012/0210133 A1 Aug. 16, 2012

Related U.S. Application Data

(63) Continuation of application No. 11/779,309, filed on Jul. 18, 2007, now Pat. No. 8,181,024.

(30) Foreign Application Priority Data

Sep. 8, 2006 (JP) ................................ 2006-243949

(51) Int. Cl.
*H04L 29/06* (2006.01)
*G06F 21/72* (2013.01)
*H04L 9/06* (2006.01)

(52) U.S. Cl.
CPC ............ *G06F 21/72* (2013.01); *H04L 63/0485* (2013.01); *H04L 63/123* (2013.01); *H04L 9/0643* (2013.01); *H04L 63/166* (2013.01); *H04L 2209/125* (2013.01)

USPC .......................................... 713/171; 713/180

(58) Field of Classification Search
USPC .................................................. 713/170, 181
See application file for complete search history.

(56) References Cited

U.S. PATENT DOCUMENTS

| 6,101,255 | A | 8/2000 | Harrison et al. |
|---|---|---|---|
| 7,788,482 | B2 | 8/2010 | Irwin, Jr. |
| 2006/0250973 | A1 | 11/2006 | Trott |
| 2007/0173194 | A1 | 7/2007 | Vare et al. |

FOREIGN PATENT DOCUMENTS

| JP | 10-320191 | 12/1998 |
|---|---|---|
| JP | 2004-053716 | 2/2004 |
| JP | 2004-320533 | 11/2004 |
| JP | 2005-167870 | 6/2005 |
| JP | 2006-041684 | 2/2006 |

*Primary Examiner* — Christopher Brown
(74) *Attorney, Agent, or Firm* — Antonelli, Terry, Stout & Kraus, LLP.

(57) ABSTRACT

In the configuration performing a data processing by a hardware processing circuit (accelerator), to provide a technology capable of improving a poorness of processing efficiency by multiple accesses to the data, the following solving means are provided. A network data processing accelerator of the present network data processing apparatus comprises processing units corresponding to each processing of an encryption/decryption, a message authentication, and a checksum, and in the data processing including a combination of each processing, accesses for the same data of the memory and the like through a bus I/F unit and the like is collected together into one time, and a pipeline processing is performed using the least common multiple of the data processing unit of each processing.

8 Claims, 8 Drawing Sheets

DATA PROCESSING APPARATUS

CROSS-REFERENCE TO RELATED APPLICATION

The present application is a continuation application of Ser. No. 11/779,309 now U.S. Pat. No. 8,181,024, filed Jul. 18, 2007 which claims priority from Japanese Patent Application No. JP 2006-243949 filed on Sep. 8, 2006, the content of which is hereby incorporated by reference into this application.

TECHNICAL FIELD OF THE INVENTION

The present invention relates to a technology of a data processing apparatus in which a predetermined processing (data processing) is performed for the data to be read and accepted (received) from a memory, a network, a bus and the like in the data processing unit composed of hardware (hardware processing circuit), and the processed data is written and transferred (transmitted) to the memory, the network, the bus, and the like. In particular, the invention relates to a technique to perform processes such as an encryption/decryption processing of the file and a falsification detection processing, or an encryption/decryption processing, a message authentication processing, a checksum processing and the like in the communication protocol processing of the network, as the predetermined processing, for example, effectively at high speed.

BACKGROUND OF THE INVENTION

In recent years, technology of information confidentiality, in which, the data is encrypted and transmitted by a transmitter, and the data transmitted is received and decrypted by a receiver, so that the data is transmitted and received safely, has been known in the field of computer and communication. For example, in data communications using the network, in order to secure confidentiality and perfectibility of the data, the technique of encryption and message authentication are used. Further, the same technique is employed for protection and integrity securement of the files such as contents stored in the media.

Conventionally, for the execution of the encryption/decryption, message authentication, checksum and the like, a structure in which the execution performed mainly by software has been employed. This structure, which performs by software, can be used flexibly, however, as the predetermined processing becomes complicated, the processing time becomes longer, therefore, there is a problem that the processing throughput is deteriorated.

As one method to solve this problem, as disclosed in Japanese Patent Application Laid-Open Publication No. 2004-53716 (Patent Document 1) and Japanese Patent Application Laid-Open Publication No. 10-320191 (Patent Document 2), the method in which processing such as the encryption/decryption and the message authentication is performed by hardware processing circuit, so that the acceleration (speed-up) of the processing is achieved, is considered. That is, in this method, a data processing unit (accelerator) composed of hardware for speed-up corresponding to the specific processing such as encryption/decryption is provided. In this method, even if the specific processing is complicated, the deterioration of the processing throughput can be prevented.

SUMMARY OF THE INVENTION

Further, algorithms for the processing such as the encryption/decryption and the message authentication are various.

For example, in the network security protocol as represented by IPsec (IP Security Protocol) and SSL (Secure Socket Layer)/TLS (Transport Layer Security), an encryption/decryption processing using a common key cryption such as DES (Data Encryption Standard) and AES (Advanced Encryption Standard) and a message authentication processing using hash algorithm such as MD5 (Message Digest #5) and SHA-1 (Secure Hash Algorithm) have been obligatory to use. But, since the processings of these encryption/decryption and message authentication have been separated into layers as a protocol, these processings have been performed in each layer independently.

However, for example, for a payload portion (data main body) which occupies a majority in the packet, the processings of the encryption/decryption, the hash value calculation of the message authentication, and the checksum are executed redundantly. That is, these processings of multiple types are performed for the same data by the corresponding data processing units (accelerators). In this case, various types of the accelerators access to the same data individually and carry forward the processing. Hence, there has been a problem that multiple accesses, for example, overlapping of the data reading/writing to the same address of the memory cause deterioration of the processing efficiency.

The technique disclosed in the above described Patent Documents 1 and 2 is an example of the accelerator corresponding to the individual processing, and is not sufficient in its efficiency in the case where the processings of multiple types are performed for the same data.

The present invention has been made in view of the above described problem, and an object of the invention is to provide a technique to improve a poorness of the processing efficiency by multiple accesses to the data in the configuration to perform a predetermined data processing by a hardware processing circuit (accelerator) for speed-up.

From among the aspects of the invention disclosed in the present application, the outline of a representative aspect is briefly described as follows. For achieving the above described object, the present invention is a technique of the data processing apparatus such as a semiconductor integrated circuit device (IC) performed by a hardware processing circuit (accelerator) for speeding up a predetermined data processing, and is characterized by comprising the following technical means.

The present data processing apparatus comprises, as a processing unit corresponding to each of processing of multiple type composing the data processing, for example, an encryption/decryption processing unit which performs a processing of the data encryption and decryption, a message authentication processing unit which performs a processing of the data message authentication and a checksum processing unit which performs a processing of the data checksum, accesses to the data, and executes a predetermined data processing including a combination of the encryption or decryption by the encryption/decryption unit, the message authentication by the message authentication processing unit, and a checksum processing by a checksum processing unit. The data processing to be subject is configured by including the processings of multiple types, and is a combination of those in which input and output accesses for the same data by the processings of multiple types have been conventionally overlapped, the processing result of the preceding stage is used by the subsequent stage, and the processing of the input and output accesses such as the data reading/writing for the memory, network, and bus is executed.

In the present data processing apparatus, as means for effectively performing processings of multiple types configuring the predetermined data processing in parallel and/or sequential in the predetermined order and combination, as for access to a first data (the same data and the like) in the processings of multiples types, accesses which is conventionally overlapped are collected into one (minimum) time. In other words, the number of accesses is collected into the number of times fewer than the case where, conventionally, each type of the processing units individually accesses to the data. As a result, the processing units corresponding to the processings of multiple types operate in parallel and/or sequential, therefore, the bus occupancy and the time required for execution of the processing of each type are reduced.

Further, in the predetermined data processing for the first data, the least common multiple of each data processing unit of the processings of multiple types composing the data processing and the corresponding processing unit is used as a unified data processing unit in those processing units, and pipeline processing is executed.

Further, the present data processing apparatus further comprises an interface unit that performs the input/output of the data, and accesses to the data to process it through the interface unit in the predetermined data processing. Further, for example, combination or order of the processings of multiple types, and various types (system, algorithm, protocol, and the like) of the processings such as encryption/decryption and message authentication in the processing units are designated by register and descriptor, and the processings are executed.

From among the aspects of the invention disclosed in the present application, the effect obtained by a representative aspect will be briefly described as follows. According to the present invention, in the configuration in which the predetermined data processing is performed by a hardware processing circuit (accelerator) for speed-up, a poorness of processing efficiency by multiple accesses to the data can be improved. In particular, there is an advantage that bus occupancy required for the execution of the processing and the like are reduced, and a throughput of the whole processing is increased.

BRIEF DESCRIPTIONS OF THE DRAWINGS

Figure 8:
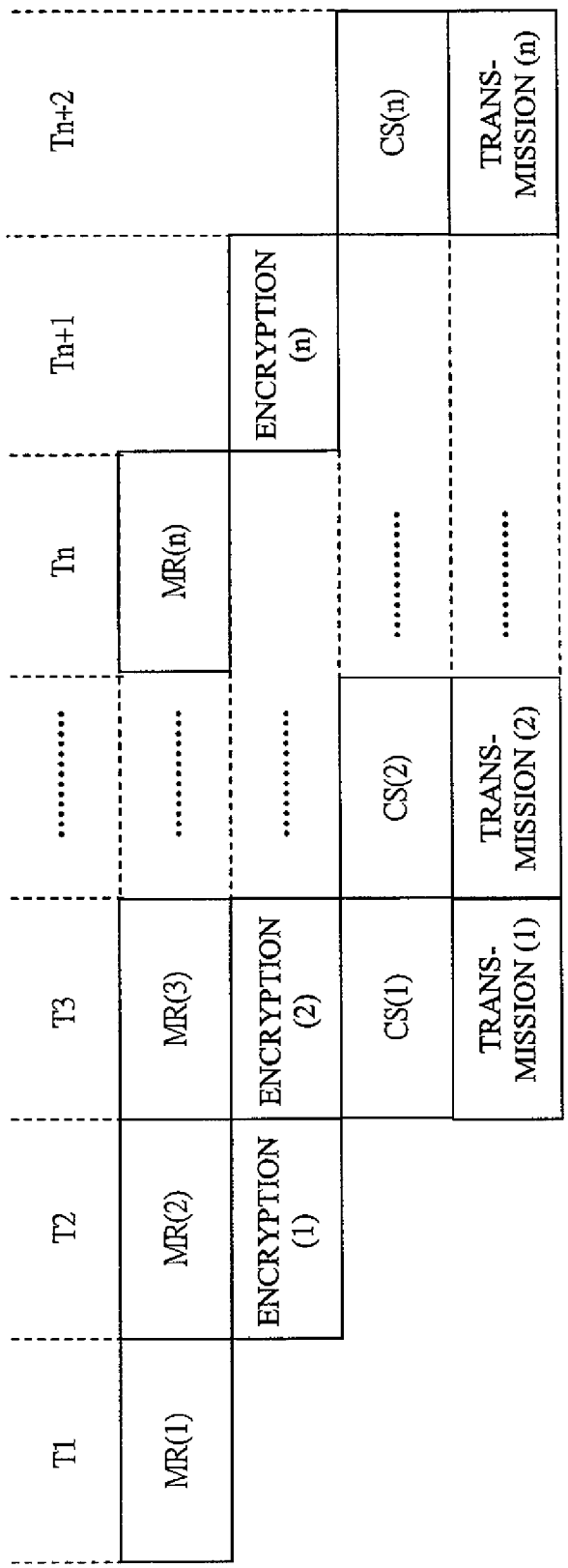
Figure 9:
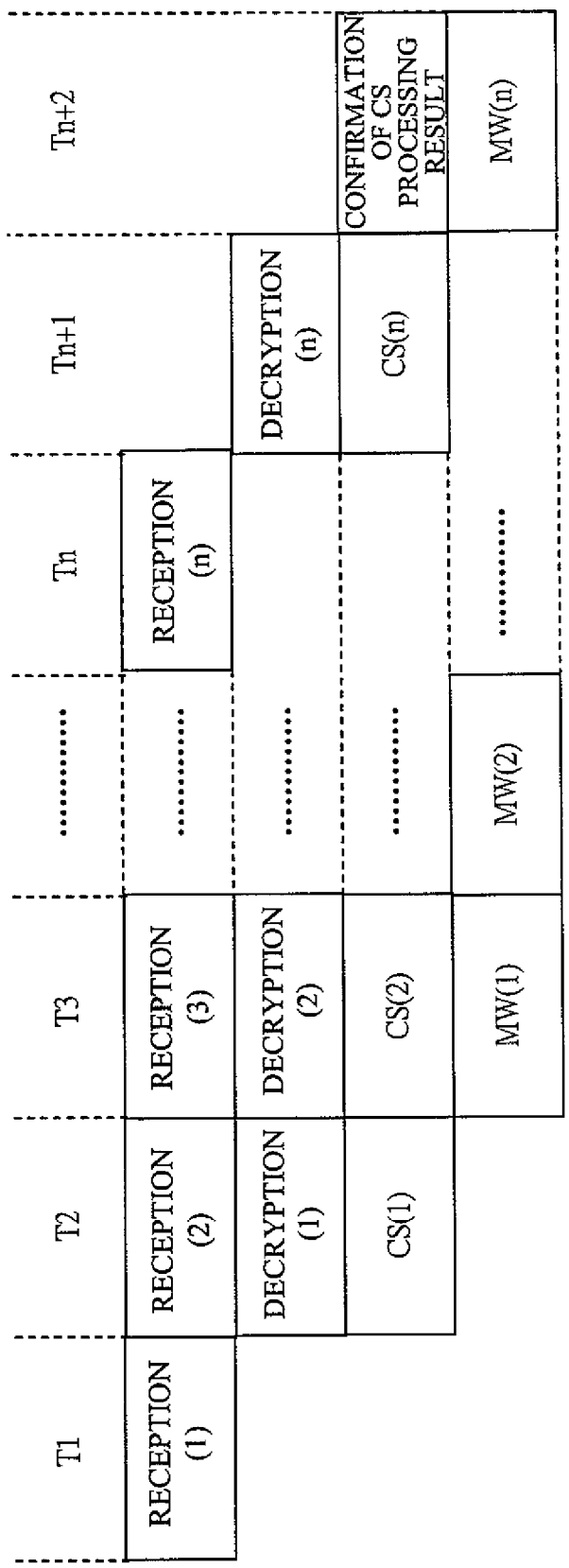

FIG. 8 is a view for explaining a pipeline processing operation of the data processing in transmission of DTCP-IP and IP broadcasting in the network data processing apparatus of one embodiment of the present invention; and FIG. 9 is a view for explaining a pipeline processing operation of the data processing in reception of DTCP-IP and IP broadcasting in the network data processing apparatus of one embodiment of the present invention.

DESCRIPTIONS OF THE PREFERRED EMBODIMENTS

Hereinafter, the embodiments of the present invention will be described in detail with reference to the drawings. Note that, in all the drawings for explaining the embodiments, the same reference symbols will be attached to the same components, and the repeated description thereof will be omitted.

In the embodiments of the present invention, the accelerator performing the network data processing includes a processing unit for each of the processings of multiple types, and is characterized by that the number of data access time to a memory (bus) and a network is minimum and that an operation of pipeline processing realized by unification of the data processing unit of the multiple processing units is executed.

Figure 1:
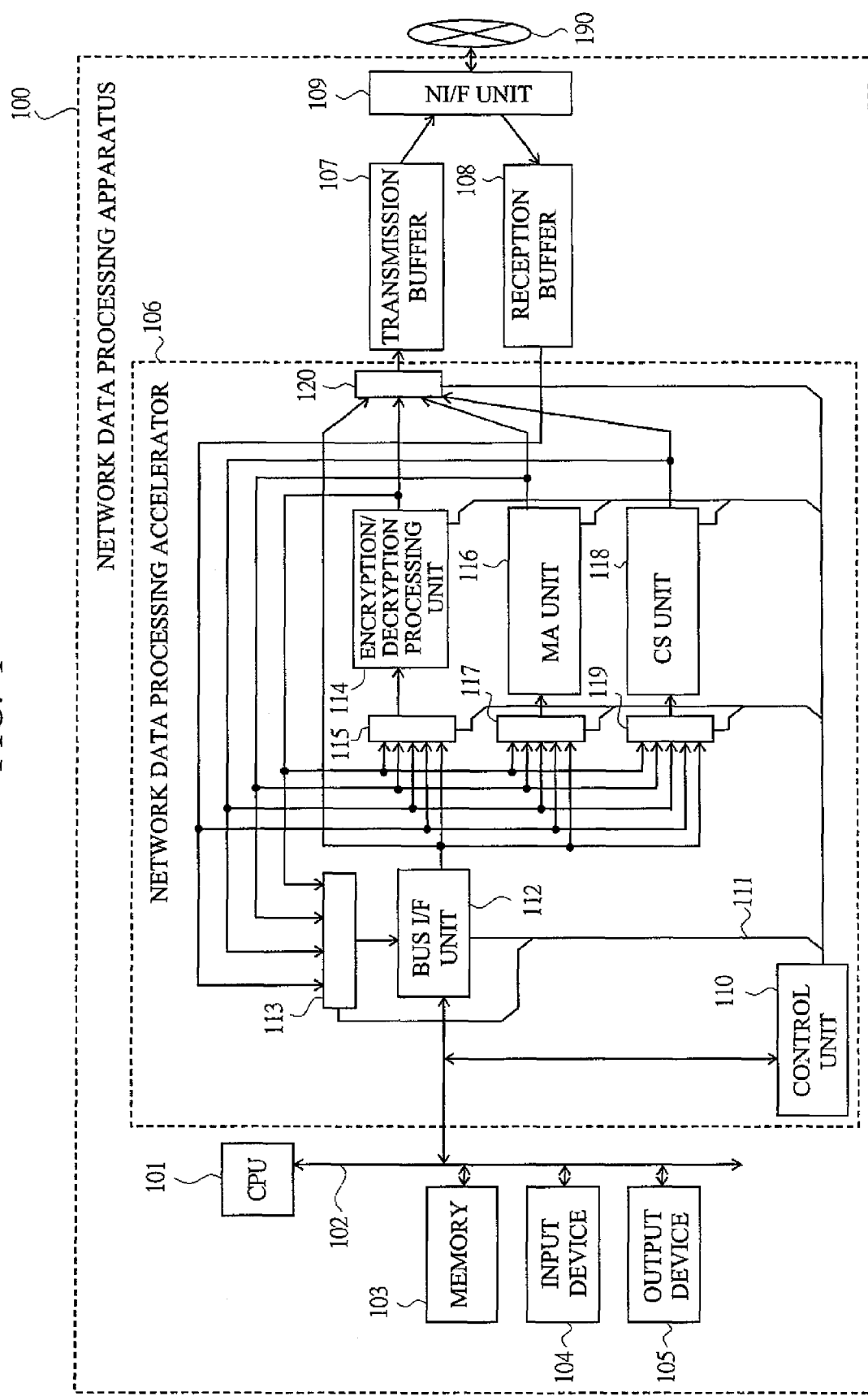
FIG. 1 is a view showing a whole functional block configuration of a network data processing apparatus of one embodiment of the present invention.
Figure 2:
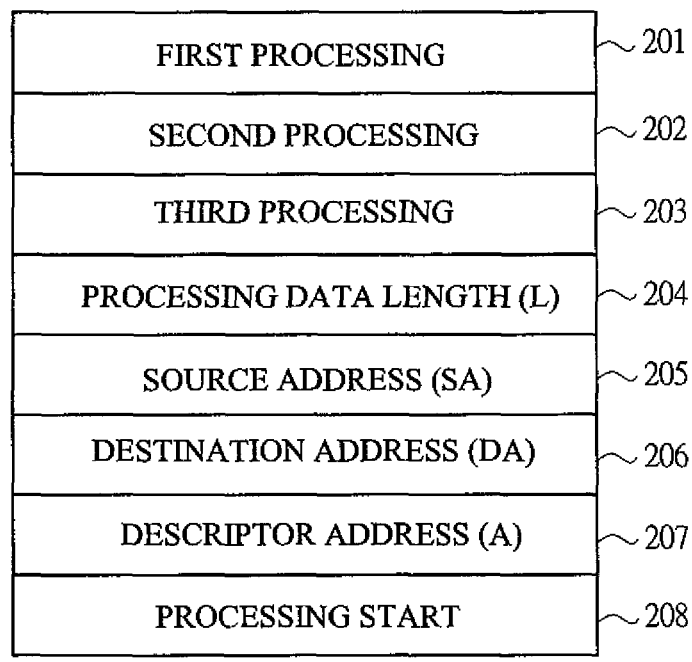
FIG. 2 is a view showing a register configuration of a network data processing accelerator in the network data processing apparatus of one embodiment of the present invention.
Figure 3:
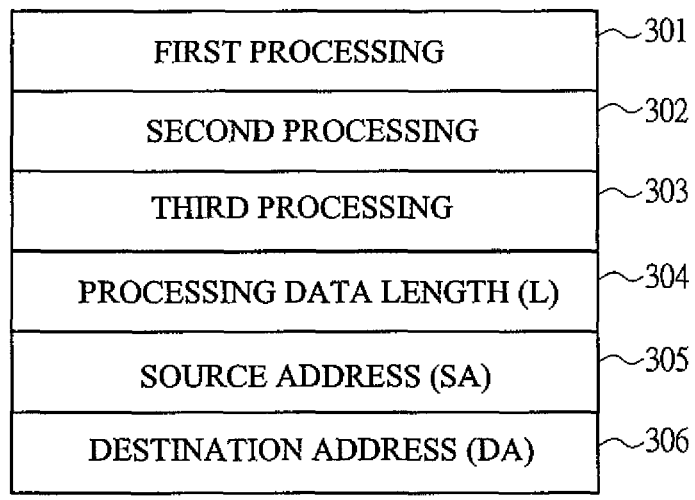
FIG. 3 is a view showing a descriptor configuration of the network data processing accelerator in the network data processing apparatus of one embodiment of the present invention.
Figure 4:
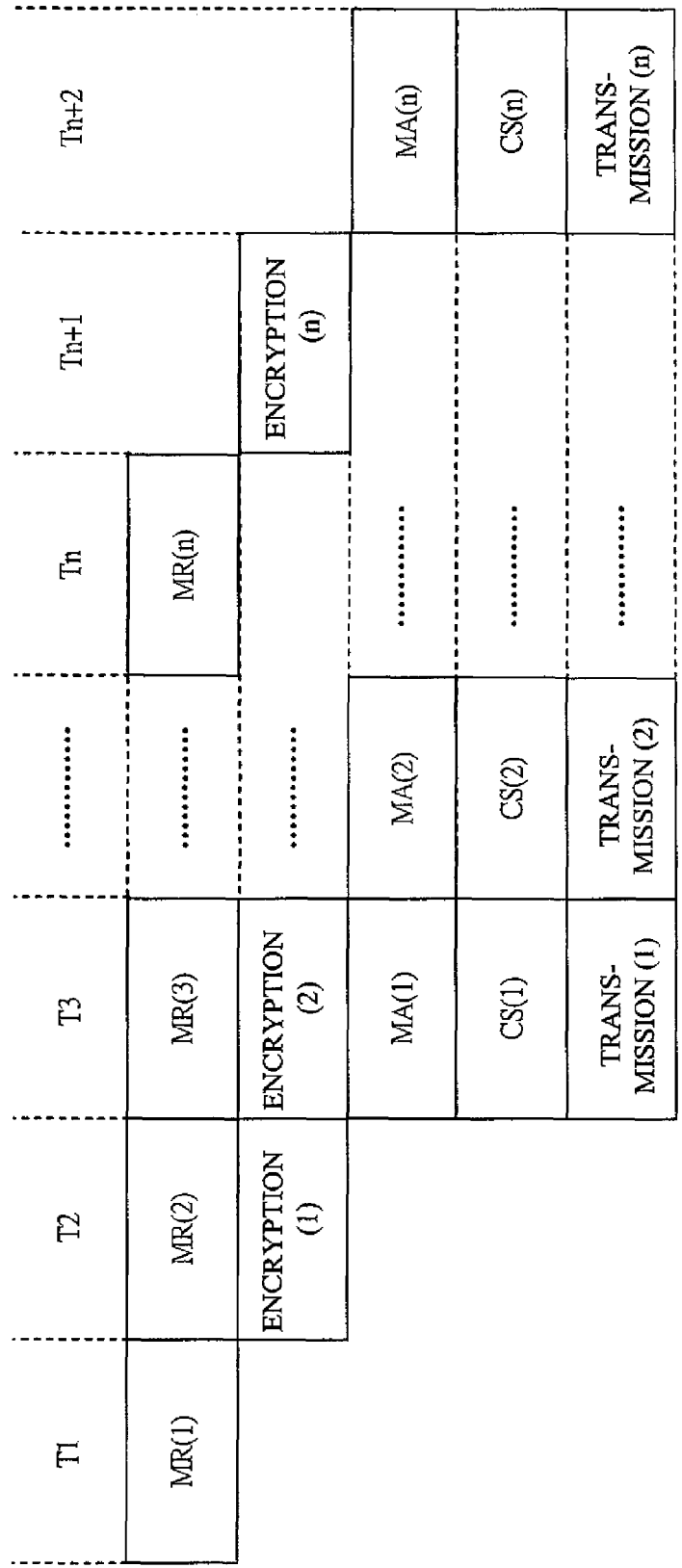
FIG. 4 is a view for explaining a pipeline processing operation of the data processing in SSL/TLS transmission in the network data processing apparatus of one embodiment of the present invention.

A network data processing apparatus of one embodiment of the present invention will be explained with reference to FIGS. 1 to 4. FIG. 1 shows a whole configuration of the present network data processing apparatus (abbreviated as data processing apparatus). FIG. 2 shows a register configuration of a network data processing accelerator (abbreviated as accelerator) 106 included in the present data processing apparatus 100. FIG. 3 shows a descriptor configuration of the accelerator 106. FIG. 4 shows a pipeline processing operation of an accelerator 106 in the data processing of a SSL/TLS transmission.

<Network Data Processing Apparatus>

In FIG. 1, the present data processing apparatus 100 includes a CPU 101, a bus 102, a memory 103, an input device 104, an output device 105, a network data processing accelerator (accelerator) 106, a transmission buffer 107, a reception buffer 108, and a NI/F (network interface) unit 109, and is connected to a network 190 by the NI/F unit 109.

The CPU 101 manages various devices (memory 103 to accelerator 106 and the like) through the bus 102, and controls a data transmission to the network 190 and a data reception from the network 190. The memory 103 stores a program to be executed by the CPU 101 and a data. The input device 104 is a device for receiving a user operation and data of the present data processing apparatus 100. The output device 105 is a device for sending notification information and data to the user from the present data processing apparatus 100.

The transmission buffer 107 is a buffer for temporarily storing a data to be sent to the network 190. The reception buffer 108 is a buffer for temporarily storing the data received from the network 190. The NI/F unit 109 performs the transmission of the data stored in the transmission buffer 107 to the network 190 and the storage of the data received from the network 190 into the reception buffer 108.

The accelerator 106 is a hardware processing circuit for performing the processings of three types, an encryption/decryption, a message authentication, and a checksum for the transmission and reception data of the network 190 at high speed. The accelerator 106 includes a control unit 110, a control bus 111, a bus I/F unit 112, a bus output data selector 113, an encryption/decryption unit (encryption/decryption processing unit) 114, a MA unit (message authentication processing unit) 116, a CS unit (checksum processing unit)

118, an input selector (encryption/decryption unit input selector) 115, an input selector (MA unit input selector) 117, an input selector (CS unit input selector) 119, and a transmission output data selector 120.

The control unit 110 receives instructions from the CPU 101 through the bus 102, and determines operations of each block (bus I/F unit 112 to transmission output data selector 120) of the accelerator 106. The control bus 111 is a bus for transmitting the instructions from the control unit 110 to each block.

The bus I/F unit 112 is an I/F for the bus 102, and has a function for reading the data to be transmitted to the network 109 through the bus 102 from the memory 103 and the input device 104 and a function for sending (writing) the data received from the network 190 to the memory 103 and the output device 105. The bus output data selector 113 selects which data to be inputted to the bus I/F unit 112 and outputted to the memory 103 and the output device 105 through the bus I/F unit 112, a data received through the reception buffer 108 or the processing result data of the encryption/decryption unit 114, the MA unit 116, and the CS unit 118.

The encryption/decryption 114 performs the processings of the encryption and the decryption of the input data. The encryption/decryption unit 114 can perform the encryption or decryption according to the instructions. The encryption/decryption input selector 115 selects which output data is taken as a data inputted to the encryption/decryption unit 114, from the encryption/decryption unit 114, the MA unit 116, the CS unit 118, the reception buffer 108, or the bus I/f unit 112.

The MA unit 116, for message authentication processing, calculates a hash value and a MAC (message authentication code) value of the input data to perform a comparison processing. The MA unit input selector 117 selects which output data is taken as a data inputted to the MA unit 116, from the encryption/decryption unit 114, the MA unit 116, the CS unit 118, the reception buffer 108, or the bus I/F unit 112.

The CS unit 118 calculates the checksum value of the input data as a checksum processing. The CS unit input selector 119 selects which output data is taken an a data inputted to the CS unit 118, from the encryption/decryption unit 114, the MA unit 116, the CS unit 118, the reception buffer 108, or the bus I/F 112.

The transmission output data selector 120 selects which output data is taken as a data to be transmitted to the network 190 from the accelerator 106 through the transmission buffer 107, from the bus I/F unit 112, the encryption/decryption unit 114, the MA unit 116, or the CS unit 118. Each selector (113, 115, 117, 119, and 120) selects an input/output according to the instructions from the control unit 110.

<Resistor and Descriptor>

The control unit 110 has registers shown in FIG. 2. The CPU 101 sets these registers. According to such setting, the control unit 110 controls each block (112 to 120) of the accelerator 106 through the control bus 111, and performs a data processing instructed by the CPU 101. The accelerator 106 can perform an operation according to a register mode or a descriptor mode.

The registers of FIG. 2 include a first processing setting register 201, a second processing setting register 202, a third processing setting register 203, a processing data length (L) setting register 204, a source address (SA) setting register 205, a destination address (DA) setting register 206, a descriptor address (A) setting register 207, and a processing start setting register 208.

In the first processing setting register 201 to the third processing setting register 203, three types of processings (first processing to third processing) performed by the accelerator 106 and processing order thereof as components composing the predetermined data processing are set. The first processing setting register 201 sets an initial first processing. The second processing setting register 202 sets the next second processing. The third processing setting register 203 sets the next third processing. As a matter of form, the first to third processings are performed according to its sequence.

In the present embodiment, as the first processing, a read ("MR") of the memory 103 and a read ("reception") of the reception buffer 108 can be set. As the second and third processings, a combination of a write ("MW") to the memory 103, a write ("Write") to the transmission buffer 108, an encryption processing ("Encryption"), a decryption processing ("Decryption"), a message authentication processing ("MA"), a checksum processing ("CS"), and no processing can be set.

The processing data length (L) setting register 204 sets an input data length (whole size) of the data processing performed by the accelerator 106 as L. The source address (SA) setting register 205 sets an initial address of the processing object data read by the accelerator 106 from the memory 103, the input device 104, the reception buffer 108, and the like as SA. The destination address (DA) setting register 206 sets an initial address of the area in which the processing result data is transmitted to the memory 103, the output device 105, the transmission buffer 107, and the like by the accelerator 106 as DA.

In the descriptor address (A) setting register 207, an initial address of the descriptor stored in the memory 103 is set as A, in the case where the accelerator 106 executes processes in descriptor mode. The processing start setting register 208 can set "start execution in register mode", "start executing in descriptor mode", a processing stop, an encryption/decryption processing type, and a message authentication processing type and the like, and can control the start and stop of the execution of the accelerator 106 together with the instruction of the encryption/encryption and the message authentication processing type. The encryption/decryption processing type includes DES encryption/3DES encryption/AES encryption/DES decryption/3DES decryption/AES decryption and the like. The message authentication processing type includes MD5/SHA-1/SHA-224/SHA-256/SHA-384/SHA-512 and the like.

In the case where the execution is performed by the register mode, the CPU 101 sets a "start execution in register mode" code to the processing start setting register 208 after setting each register (201 to 206) of FIG. 2. A program is constructed so as to make such a setting, and is stored in the memory 103. The CPU 101 performs the setting of each of above register according to the program stored in the memory 103, and makes the accelerator 106 operate.

In the case where the execution is performed in the descriptor mode, the CPU 101 stores the descriptor having a structure shown in FIG. 3 into the memory 103, and then, sets its initial address (A) to the A setting register 207, and sets a "start execution in descriptor mode" code to the processing start setting register 208. A program is constructed so as to make such a setting, and is stored in the memory 103. The CPU 101 performs the setting of each of above register according to the program stored in the memory 103, and makes the accelerator 106 operate.

The descriptor of FIG. 3 includes a first processing setting descriptor 301, a second processing setting descriptor 302, a third processing setting descriptor 303, a processing data length (L) setting descriptor 304, a source address (SA) setting descriptor 305, a destination address (DA) setting descriptor 306.

The first processing setting descriptor 301 to the third processing setting descriptor 303 set the first to third processings to be performed by the accelerator 106. The processings can be set are the same as the case of the register mode. In the L setting descriptor 304, the SA setting descriptor 305, and the DA setting descriptor 306, L, SA, and DA are set similarly to the register mode.

<SSL/TLS Transmission>

Next, in FIG. 4, as an example of the predetermined data processing in the present embodiment, an operation of the accelerator 106 in the case of SSL/TLS transmission will be explained. In this case, as an object data processing, first, the data stored in the memory 103 is read, and the read data is encrypted. Then, a message authentication processing and a checksum processing are performed for the encrypted data, and the encrypted data is sent (written) to the transmission buffer 107. Thus, the data sent to the transmission buffer 107 is transmitted to the network 190 by the NI/F unit 109.

To allow the operation to be performed as described above, the CPU 101 of the data processing apparatus 100 sets the registers (201 to 206, and 208) as follows. The read ("MR") of the memory 103 is set to the first processing setting register 201 as a first processing. The encryption processing ("Encryption") is set to the second processing setting register 202 as a second processing. The three processings, the message authentication processing ("MA"), the checksum processing ("CS"), and the write ("Transmission") to the transmission buffer 107, are set to the third processing setting register 203 as a third processing. A data length for that the processings of the encryption, the message authentication, and the checksum are performed is set to the L setting register 204 as L. An initial address of the transmission data stored in the memory 103 is set to the SA setting register 205 as SA. An initial address of the transmittable area of the transmission buffer 107 is set to the DA setting register 206 as DA. Finally, a "start execution in register mode" code is set to the processing start setting register 208. Further, at this time, the AES encryption, as an encryption/decryption type, and SHA-1, as the message authentication type, are assumed to be instructed and set, respectively.

At this time, the control unit 110 instructs each block of the bus I/F unit 112, the encryption/decryption unit 114, the MA unit 116, and the CS unit 118 to perform a processing by 64 bytes as a unified data processing unit (M) through the control bus 111. This is determined as follows. First, the processing unit of the AES encryption in the encryption/decryption unit 114 is 16 bytes, the processing unit of the SHA-1 in the MA unit 116 is 64 bytes, and the processing unit of the checksum in the CS unit 118 is two bytes. The least common multiple of these bytes is 64 bytes. The 64 bytes is taken as a unified data processing unit (M) in each of above block of the accelerator 106. By doing so, parallel and sequential execution of the multiple processings in the accelerator 106 is facilitated, thereby, the pipeline processing becomes possible.

And, the processing unit of DES/3DES is eight bytes, the processing unit of ADE is 16 bytes, the processing units of MD5/SHA-1/SHA-224/SHA-256/SHA-384/SHA-512 are 64 bytes. Taking this into consideration, the accelerator 106 takes the least common multiple of the processing units of the encryption/decryption, the message authentication and the checksum as a unified data processing unit (M) used for the pipeline processing of these processings, according to the encryption/decryption and the message authentication type. The data processing unit (M) can be rephrased as a block size and the like.

Further, the control unit 110, in order to follow the processing order set at the registers (first processing setting register 201 to third processing setting register 203), instructs the encryption/decryption unit input selector 115 to select the input from the bus I/F unit 112 and deliver it to the encryption/decryption unit 114. And, the control unit 110 instructs the MA unit input selector 117 to select the output of the encryption/decryption unit 114 and deliver it to the MA unit 116. Further, the control unit 110 instructs the CS unit input selector 119 to select the output of the encryption/decryption unit 114 and deliver it to the CS unit 118. Then, the control unit 110 instructs the transmission output data selector 120 to select the output of the encryption/encryption unit 114 and deliver it to the transmission buffer 107.

In this manner, the present data processing apparatus 100 and the accelerator 106 take 64 bytes which is the least common multiple processing unit of the individual processing as the data processing unit (M) in the multiple processings, and by instructing each selector (113, 115, 117, 119, and 120) to select input/output of the processing data, the operation of the pipeline processing as shown in FIG. 4 is realized. If the data length set to the L setting register 204 is assumed to be L byte, and the unified data processing unit is assumed to be M byte, the processing target data in the object data processing is divided into n+2 periods (T1 to Tn+2) where n=L/M, and the pipeline processing is carried out.

This pipeline processing will be described in detail as follows. In the first period T1, as a first processing, the bus I/F unit 112 reads the data of M=64 bytes from the address (SA) set to the SA setting register 205, and delivers the data to the encryption/decryption unit 114 through the encryption/decryption unit input selector 115 (MR (1)).

Next, in the period T2, the bus I/F unit 112 reads the data of M=64 bytes from the address of SA+64 (MR (2)). In parallel with this, as a second processing, the encryption/decryption unit 114 performs the encryption of the data received from the bus I/F unit 112 in one preceding period T1, and delivers the data of its result to the MA unit 116, the CS unit 118, and the transmission buffer 107 through selectors (117, 119, and 120) (Encryption (1)).

Next, in the period T3, the bus I/F unit 112 reads the data of M=64 bytes from the address of SA+(64×2) (MR (3)). In parallel with this, the encryption/decryption unit 114 performs the encryption of the data received from the bus I/F unit 112 in the period T2, and delivers the data of its result to the MA unit 116, the CS unit 118, and the transmission buffer 107 through the selectors (117, 119, and 120) (Encryption (2)). Further, as a third processing, the MA unit 116, the CS unit 118, and the NI/F unit 109 perform each processing (MA, CS, and Transmission) for the data received from the encryption/decryption unit 114 in one preceding period T2 in parallel.

In the period Tk (3≤k≤n), the bus I/F unit 112 reads the data of M=64 bytes from the address of SAS-(64×k) (MR (k)). In parallel with this, the encryption/decryption unit 114 performs the encryption of the data received from the bus I/F unit 112 in one preceding period Tk−1, and delivers the data of its result to the MA unit 116, the CS unit 118, and the transmission buffer 107 through the selectors (117, 119, and 120) (Encryption (k)). Further, the MA unit 116, the CS unit 118, and the NI/F unit 109 perform each processing (MA (k), CS (k), and Transmission (k)) for the data received from the encryption/decryption unit 114 in one preceding period Tk−1 in parallel.

In the period Tn+1, the encryption/decryption unit 114 performs the encryption of the data received from the bus I/F unit 112 in one preceding period n, and delivers the data of its result to the MA unit 116, the CS unit 118, and the transmission buffer 107 through the selectors (117, 119, and 120) (Encryption (n)). Further, the MA unit 116, the CS unit 118, and the NI/F unit 109 perform each processing (MA (n−1), CS (n−1), Transmission (n−1)) for the data received from the encryption/decryption unit 114 in one preceding period Tn in parallel.

Finally, in the period Tn+2, the MA unit 116, the CS unit 118, and the NI/F unit 109 perform each processing (MA (n), CS (n), and Transmission (n)) for the data received from the encryption/decryption unit 114 in one preceding period Tn+1 in parallel. Thus, the object data processing is completed.

Thus, in each period (T), the processings of the memory read (MR), the encryption, the message authentication (MA), the checksum (CS), and the transmission (transmission buffer write) are divided into the first to third processing to be processed in parallel and sequential. Each period (T) is determined by the processing requiring the longest processing time among MR, Encryption, MA, CS and Transmission. For example, as a clock cycle of the accelerator 106, assume that MR requires 40 cycles, Encryption 40 cycles, MA 84 cycles, and CS 32 cycles with respect to the processing of M=64 bytes. In this case, the periods T1 and T2 are set to 40 cycles, and the periods T3 to n+2 are set to 84 cycles. Assuming that one cycle is 10 ns (nano second), for example, by using the clock of 100 MHz in the accelerator 106, the data processing including Encryption, MA, and CS can be executed with the processing throughput of about 609 Mbps in the present embodiment.

In comparison with the conventional data processing, in the case of the configuration in which each processing of Encryption, MA, and CS is mounted with different hardware (accelerator) and is operated individually, the memory read of 40 cycles and the memory write of 40 cycles are generated for the encryption processing of 64 bytes and the memory read of each 40 cycles are generated for the MA and CS processings as a data access. Therefore, for the processing of Encryption, MA, and CS of 64 bytes, they require 120(40+40+40) cycles, 124 (40+84) cycles, and 72 (40+32) cycles respectively, and, 316 cycles are required as total. For example, even if the clock of 100 MHz is used, its processing throughput is only about 162 Mbps ((68×8)/316×100≈162). Further, in this case, since the bus I/F are provided individually, there are multiple hardwares (accelerators) having a redundant function, and this makes a circuit scale relatively large.

On the other hand, in the accelerator 106 in the present embodiment, since the bus I/F unit 112 is shared with the encryption/decryption 114, the MA unit 116, and the CS unit 118, there is an advantage that the circuit scale is small. Further, since each selector (113, 115, 117, 119, and 120) is disposed such that the input/output data of the commonly shared bus I/F can be efficiently delivered to each of three processing units (114, 116, and 118), parallel and sequential processing operations can be performed efficiently, therefore, a high processing through put such as 609 Mbps as described above can be realized.

With respect to the above described, in the case where the processing is executed in the descriptor mode, the same contents as set to the registers (201 to 206) are described in the descriptors (301 to 306), its initial address is set to the A setting register 207, and "start by descriptor mode" code is set to the processing start setting register 208. Hence, the same operation as the case of the register mode is performed.

Further, with respect to the determination of the operation unit (M) of the processings of the multiple types, though the processing unit of the MA processings (MD5, SHA-1, SHA-224, SHA-256, SHA-384, and SHA-512) has been 64 bytes conventionally, this can be further divided into smaller unit and processed. For example, this MA processing is divided into four units so that 16 bytes can be made as a processing unit. In this case, presuming that DES is selected as the encryption/decryption processing and SHA-256 is selected as the MA processing and the CS processing is performed at the same time with these processings, each processing unit becomes 8 bytes, 16 bytes, and 2 bytes. Hence, its least common multiple becomes 16 bytes, and the pipeline processing can be similarly performed with the data processing unit (M) in the present accelerator 106 being set to 16 bytes. As described above, for the divisible processing, by dividing the processing unit to make it smaller, a configuration with reduced circuit scale can be obtained.

With respect to the processings of the multiple types operated in parallel and sequential by the accelerator 106 by the setting of the register and the like, though an example in which the three types of the first to third processing can be set has been shown, the processing can be similarly realized even if the number of this type is two or four or more. Further, the form of the registers and the like is not limited to the above described, and for example, the setting of the processing order and the processing group and the like may be set. And, the processing settable to the registers and the like may be not limited to the above described combination (MR, MW, Encryption, Decryption, MA, CS, Transmission, and Reception). Further, as the predetermined data processing, it is not limited to the above described security related processing, but, for example, it may be various calculations of an image processing system and a digital filter.

As described above, according to the present embodiment, particularly, by collecting the accesses to the data in the processings of multiple types such as encryption/decryption, MA, CS, and the like all together into one time, the bus occupancy required for the execution of the processing and the like is reduced. Further, with reduction of the number of data accesses, the processings of multiple types are subjected to the pipeline processing parallel and sequential, as a result, the throughput of the whole processing can be improved.

<SSL/TLS Reception>

Next, in FIG. 5, in the similar basic configuration, the operation of the accelerator 106 in the data processing in the case of SSL/TLS reception will be explained. In the case of SSL/TLS reception, as an object data processing, first, the NI/F unit 109 receives data from the network 190, and stores the data in the reception buffer 108. Next, the processings of CS, MA and Decryption of the data are performed in parallel and simultaneously in the encryption/decryption unit 114, the MA unit 116, and the CS unit 118. After that, the data of the decryption result is written to the memory 103 or the output device 105 through the bus I/F unit 112.

To allow the described operation to be performed, the present data processing apparatus 100 sets the registers (201 to 206, and 208) as follows. A reception, that is, the storage of the reception data into the reception buffer 108 (read from the reception buffer 108) is set to the first processing setting register 201 as a first processing. A combination of the processings of CS, MA and Decryption is set to the second processing setting register 202. The write (MR) to the memory 103 is set to the third processing setting register 203. A length of data for performing the first to third processings set to the registers (201 to 203) is set to the L setting register 204 as L. An initial address of the storage area of the reception data of the reception buffer 108 is set to the SA setting register 205 as SA. An initial address of the area storing the decryption result of the reception data in the memory 103 is set to the DA setting register 206 as DA. Finally, together with the encryption/decryption processing type and the message authentication processing type, a "start processing in register mode" code is set to the processing start setting register 208.

Further, at this time, the control unit 110 starts the processing by taking the least common multiple of each processing unit of the processings of Encryption/Decryption, MA, and CS as a unified processing unit (M) of the processings.

Further, in order to follow the processing sequence set to the registers (201 to 203), the control unit 110 instructs the encryption/decryption unit input selector 115 to select the input from the reception buffer 108 and deliver it to the encryption/decryption unit 114. In the same manner, the control unit 110 instructs also the MA unit input selector 117 to select the input from the reception buffer 108 and deliver it to the MA unit 116. The control unit 110 also instructs the CS unit input selector 119 to select the input from the reception buffer 108 and deliver it to the CS unit 118. Then, the control unit 110 instructs the bus output data selector 113 to select the input from the encryption/encryption unit 114 and deliver it to the bus I/F unit 112.

Figure 5:
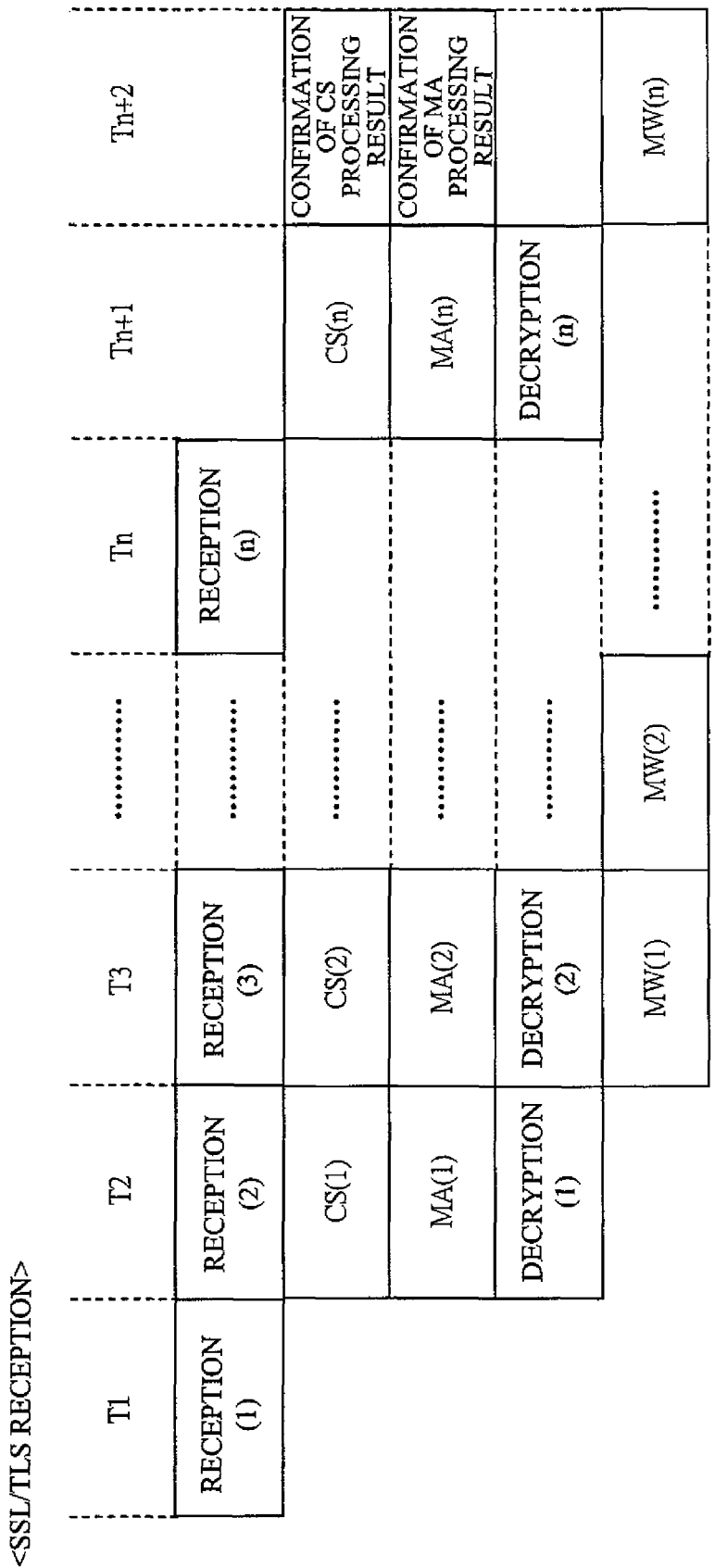
FIG. 5 is a view for explaining a pipeline processing operation of the data processing in SSL/TLS reception in the network data processing apparatus of one embodiment of the present invention.

Thus, by taking the data processing unit (M) as 64 bytes, and instructing each selector (113, 115, 117, 119, and 120) on a selection of the input/output of the processing data, the operation of the pipeline processing shown in FIG. 5 is realized.

In the pipeline processing of FIG. 5, first, in the period T1, as a first processing, the NI/F unit 109 receives a first M=64 bytes and stores it in the reception buffer 108 (Reception (1)). In the next period T2, in the same manner, the NI/F unit 109 receives a data of a second 64 bytes, and stores it in the reception buffer 108 (reception (2)), and as a second processing, the CS unit 118, the MA unit 116, and the encryption/decryption unit 114 performs each processing (CS (1), MA (1), and Decryption (1)) for the first reception data in the period T1 in parallel. In the period Tk (3≤k≤n), the NI/F unit 109 receives the data of the k-th 64 bytes (Reception (k)), and the CS unit 118, the MA unit 116, and the encryption/decryption unit 114 performs each processing (CS(k−1), MA(k−1), and Decryption(k−1)) for the (k−1)-th reception data in the period Tk−1 in parallel. Further, the data decrypted by the encryption/decryption unit 114 in the period Tk−1 is written to the memory 103 through the bus I/F unit 112 (MW(k−2)). In the period Tn+1, the CS unit 118, the MA unit 116, and the encryption/decryption unit 114 perform each processing (CS (n), MA(n), Decryption(n)) for the n-th reception data in the period Tn in parallel. Further, the data decrypted by the encryption/decryption unit 114 in the period Tn is written to the memory 103 through the bus I/F unit 112 (MW(n−1)). In the period Tn+2, in parallel with the confirmation of the CS processing result and the MA processing result, the data decrypted by the encryption/decryption unit 114 in the period Tn+1 is written to the memory 103 through the bus I/F unit 112 (MW(n)). Thus, the operation is completed.

Thus, by performing the processings of Reception, CS, MA, Decryption, and MW in parallel, a high speed reception processing can be performed.

<IPsec Transmission>

Next, in FIG. 6, in the similar basic configuration, the operation of the accelerator 106 in the data processing in the case of an IPsec transmission will be explained. In the case of the IPsec transmission, as an object data processing, first, the data stored in the memory 103 is read, and the processings of CS and Encryption are performed for the data. Together with performing MA processing for the data encryption processing is performed, the encrypted data is transmitted to the network 190.

To allow the described operation to be performed, the data processing apparatus 100 sets the registers (201 to 206, and 208) as follows. A read (MR) of the memory 103 is set to the first processing setting register 201. A combination of CS and Encryption is set to the second processing setting register 202. A combination of MA and Transmission (write to the transmission buffer 107) is set to the third processing setting register 203. A data length performing the processings of CS, Encryption, MA, and Transmission is set to the L setting register 204 as L. An initial address of the transmission data stored in the memory 103 is set to the SA setting register 205 as SA. An initial address of the transmission capable area of the transmission buffer 107 is set to the DA setting register 206 as DA. Finally, together with the encryption/decryption processing type and the message authentication processing type, a "start processing in register mode" code is set to the processing start setting register 208. And, at this time, the control unit 110 starts the processing taking the least common multiple of each processing unit of the processings of Encryption/Decryption, MA and CS as a processing unit (M).

Further, in order to follow the processing order set at the registers (201 to 203), the control unit 110 instructs the encryption/decryption unit input selector 115 to select the input from the bus I/F unit 112 and deliver it to the encryption/decryption unit 114. In the same manner, the control unit 110 instruct also the MA unit input selector 117 to select the output from the encryption/decryption unit 114 and deliver it to the MA unit 116. The control unit 110 also instructs the CS unit input selector 119 to select the output of the bus I/F unit 112 and deliver it to the CS unit 118. Then, the control unit 110 instructs the transmission output data selector 120 to select the output of the encryption/encryption unit 114 and deliver it to the transmission buffer 107.

Figure 6:
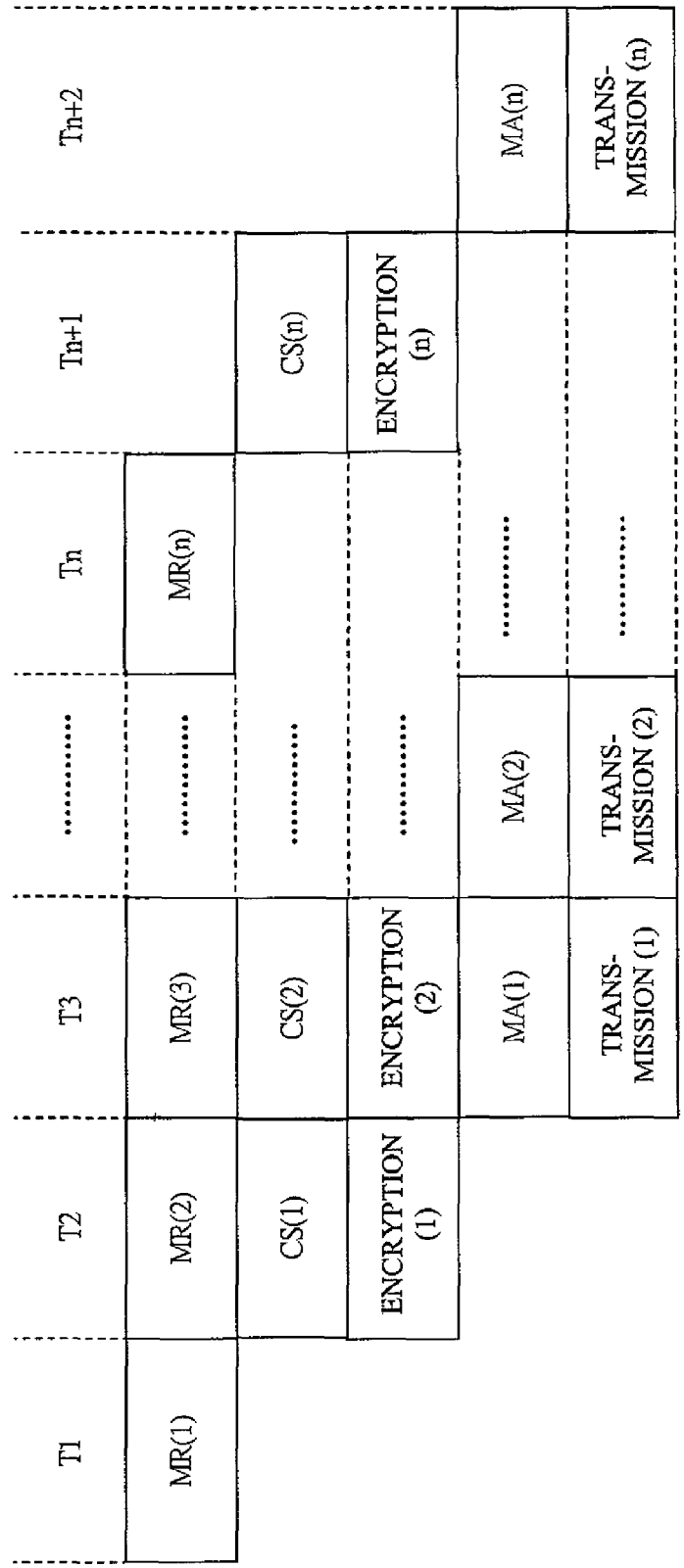
FIG. 6 is a view for explaining a pipeline processing operation of the data processing in IPsec transmission in the network data processing apparatus of one embodiment of the present invention.

Thus, by taking the data processing unit (M) as 64 bytes, and instructing each selector (113, 115, 117, and 120) on selection of the input/output of the processing data, the operation shown in FIG. 6 is realized.

In the pipeline processing of FIG. 6, first, in the period T1, as a first processing, the bus I/F unit 112 reads the data of M=64 bytes from SA and delivers it to the CS unit 118 and the encryption/decryption unit 114 through the CS unit input selector 119 and the encryption/decryption input selector 115 (MR (1)). In the period T2, in the same manner, the bus I/F unit 112 reads the data of M=64 bytes from the address of SA+64 (MR (2)). In parallel with this, as a second processing, the CS unit 118 and the encryption/decryption unit 114 performs the processings of CS and Encryption of the data received from the bus I/F unit 112 in the period T1 (CS(1) and Encryption(1)). The encryption result is delivered to the transmission buffer 107 through the transmission output data selector 120. In the period Tk (3≤k≤n), the bus I/F unit 112 reads the data of M=64 bytes from the address of SA+(64×k) (MR (k)). In parallel with this, the CS unit 118 and the encryption/decryption unit 114 perform the processings of CS and encryption for the data read from the memory 103 by the bus I/F unit 112 in the period Tk−1 (CS (k−1) and Encryption (k−1)). Further, as a third processing, the MA unit 116 and the NI/F unit 109 perform the processing of MA and transmission of the data of M=64 bytes encrypted by the encryption/decryption unit 114 in the period Tk−1 (MA (k−2) and Transmission (k−2)). In the period Tn+1, the CS unit 118 and the encryption/decryption unit 114 perform the processing of CS and Encryption for the data read from the memory 103 by the bus I/F unit 112 in the period Tn−1 (CS(n) and Encryption (n)). Further, the MA unit 116 and the NI/F unit 109 perform the processing of MA and transmission of the data of M=64 bytes encrypted by the encryption/decryption unit 114 in the period Tn−1 (MA (n−1) and Transmission (n−1)). In the period Tn+2, the MA unit 116 and the NI/F unit 109 perform the processing of MA and transmission of the data of M=64 bytes encrypted by the encryption/decryption unit 114 in the period Tn (MA (n) and Transmission (n)). Thus, the operation is completed.

Thus, by performing the processings of MR, Encryption, MA, CS, and Transmission in parallel, a high speed transmission processing can be realized.

<IPsec Reception>

Next, in FIG. 7, in the similar basic configuration, the operation of the accelerator 106 in the data processing in the case of an IPsec reception will be explained. In the case of the Ipsec reception, as an object data processing, first, the NI/F unit 109 receives the data from the network 190, and the data is stored in the reception buffer 108. Next, the processings of MA and Decryption of the data are performed in parallel. And, for the data of the decryption result, CS processing and write to the memory 103 are performed.

To allow the described operation to be performed, the present data processing apparatus 100 sets the registers (201 to 206, and 208) as follows. A reception, that is, the storage of the reception data into the reception buffer 108 is set to the first processing setting register 201. A combination of MA and Decryption is set to the second processing setting register 202. A combination of CS and MR is set to the third processing setting register 203. A data length performing the first to third processings set to the registers (201 to 203) is set to the L setting register 204 as L. An initial address of the reception data storage area of the reception buffer 108 is set to the SA setting register 205. An initial address of the area storing the decryption result of the reception data in memory 103 is set to the DA setting register 206. Finally, together with the encryption/decryption processing type and the message authentication processing type, a "start processing in register mode" code is set to the processing start setting register 208. Further, at this time, the control unit 110 starts the processing with taking the least common multiple of each processing unit of the processings of Encryption/Decryption, MA, and CS as a processing unit (M).

And, the control unit 110, in order to follow the processing order set to the registers (201 to 203), instructs the encryption/decryption unit input selector 115 to select the input from the reception buffer 108 and deliver it to the encryption/decryption unit 114. In the same manner, the control unit 110 instruct also the MA unit input selector 117 to select the input from the reception buffer 108 and deliver it to the MA unit 116. The control unit 110 also instructs the CS unit input selector 119 to select the input from the encryption/decryption unit 114 and deliver it to the CS unit 118. Then, the control unit 110 instructs the bus output data selector 113 to select the input from the encryption/encryption unit 114 and deliver it to the bus I/F unit 112.

Figure 7:
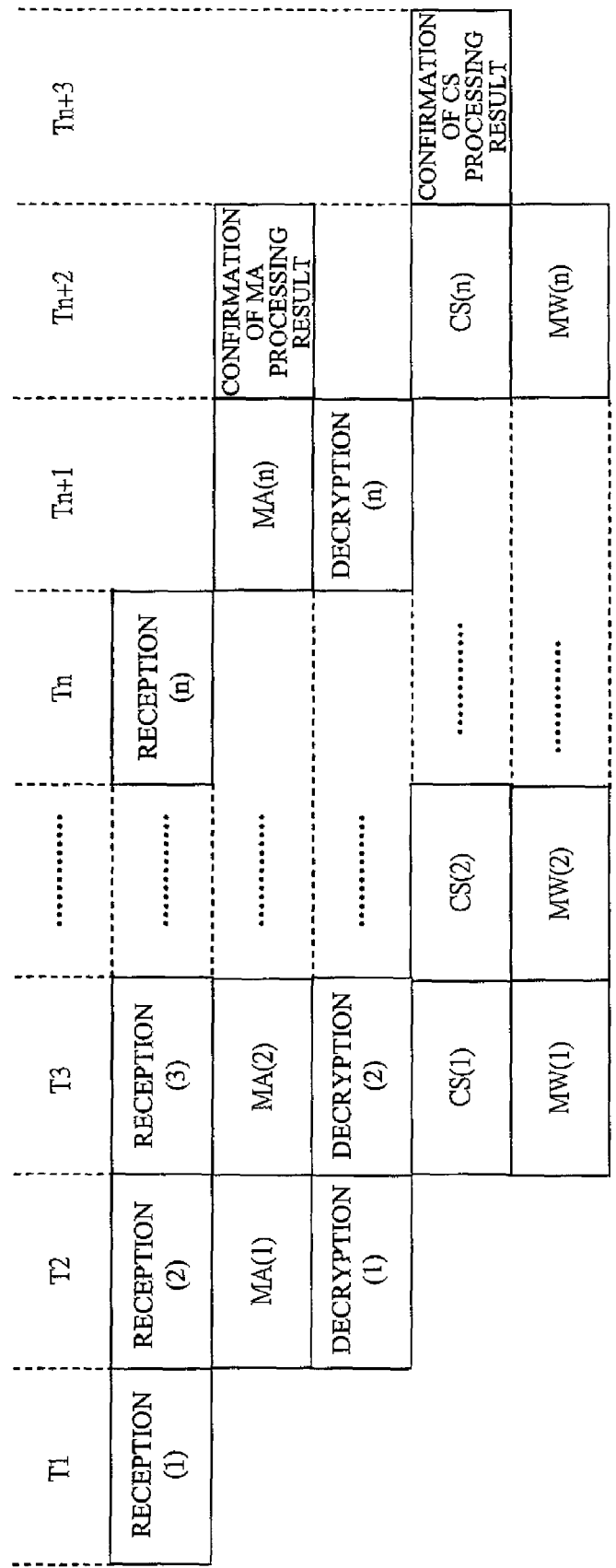
FIG. 7 is a view for explaining a pipeline processing operation of the data processing in IPsec reception in the network data processing apparatus of one embodiment of the present invention.

In this manner, by setting the processing unit (M) to 64 bytes, and instructing each selector (113, 115, 117, and 120) to select the input/output of the processing data, the operation of the pipeline processing shown in FIG. 7 is realized.

In the pipeline processing of FIG. 7, first, in the period T1, as a first processing, the NI/F unit 109 receives the data of first M=64 bytes and stores it in the reception buffer 108 (Reception (1)). In the period T2, the NI/F unit 109 receives the data of second M=64 bytes (reception (2)) in the same manner. In parallel with this, as a second processing, the MA unit 116 and the encryption/decryption unit 114 perform the processings of MA and decryption of the initial data received by the NI/F unit 109 in the period T1 (MA (1) and Decryption (1)). In the period Tk (3≤k≤n), the NI/F unit 109 receives the data of the k-th M=64 bytes (Reception (k)). In parallel with this, the MA unit 116 and the encryption/decryption unit 114 perform the processing of MA and decryption of the (k−1)-th data received by the NI/F unit 109 in the period Tk−1 (MA (k−1) and Decryption (k−1)). Further, in parallel with this, as a third processing, the CS unit 118 and the bus I/F unit 112 perform the CS processing for the (k−2)-th data decrypted by the encryption/decryption unit 114 in the period Tk−1 and a write to the memory 103 of the decryption result (Decryption (k−2) and MR (k−2)). In the period Tn+1, the processings of MA and the decryption of the n-th data received by the NI/F unit 109 in the period Tn are performed in parallel (MA (n) and Decryption (n)). Further, in parallel with this, the CS processing of the (n−1) th data decrypted by the encryption/decryption unit 114 in the period Tn and a memory write are performed (CS (n−1) and MR (n−1)). In the period Tn+2, together with the confirmation of the MA processing result, the CS processing of the n-th data decrypted by the encryption/decryption unit 114 in the period Tn+1 and a memory write are performed in parallel (CS (n) and ME (n)). In the period Tn+3, the confirmation of the CS processing result for the n-th data is performed. Thus, the pipeline processing is completed.

Thus, by performing the processings of Reception, MA, Decryption, CS, and MR in parallel, a high speed transmission processing can be performed.

<DTCP-IP, IP Broadcasting Transmission>

Next, in FIG. 8, in the similar basic configuration, the operation of the accelerator 106 in the data processing in the case of DTCP-IP (Digital Transmission Content Protection over Internet Protocol) and IP broadcasting transmission will be explained. In the case of the transmission of DTCP-IP and IP broadcasting, as an object data processing, first, the data stored in the memory 103 is read, and the encryption processing is performed for the data. Then, the CS processing is performed for the encrypted data, and the encrypted data is transmitted to the network 190.

To allow the described operation to be performed, the present data processing apparatus 100 sets the registers (201 to 206, and 208) as follows. A read (MR) of the memory 103 is set to the first processing setting register 201. An encryption processing is set to the second processing setting register 202. A combination of CS and Transmission is set to the third processing setting register 203. A data length performing the first to third processings set to the registers (201 to 203) is set to the L setting register 204 as L. An initial address of the transmission data stored in the memory 103 is set to the SA setting register 205 as SA. An initial address of the transmission capable area of the transmission buffer 107 is set to the DA setting register 206 as DA. Finally, together with the encryption/decryption processing type and the message authentication processing type, a "start processing in register mode" code is set to the processing start setting register 208. Further, at this time, the control unit 110 starts the processing with taking the least common multiple of each processing unit of the processings of Encryption and CS as a processing unit (M).

Further, the control unit 110, in order to follow the processing order set to the registers (201 to 203), instructs the encryption/decryption unit input selector 115 to select the input from the bus I/F unit 112 and deliver it to the encryption/decryption unit 114. In the same manner, the control unit 110 instructs also the CS unit input selector 119 to select the input from the encryption/decryption unit 114 and deliver it to the CS unit 118. And, the control unit 110 also instructs the transmission output data selector 120 to select the input from the encryption/decryption unit 114 and deliver it to the transmission buffer 107.

In this manner, by taking the processing unit (M) as 64 bytes, and instructing each selector (113, 115, 117, and 120)

to select the input/output of the processing data, the operation of the pipeline processing as shown in FIG. 8 is realized.

In the pipeline processing of FIG. 8, first, in the period T1, as a first processing, the bus I/F unit 112 reads the data of M=64 bytes from SA and delivers it to the encryption/decryption unit 114 (MR (1)). In the period T2, the bus I/F unit 112 reads the data of M=64 bytes from the address of SA+64 (MR (2)). In parallel with this, as a second processing, the encryption/decryption unit 114 performs the encryption processing of the data received from the bus I/F unit 112 in the period T1 (Encryption(1)). In the period Tk (3≤k≤n), the bus I/F 112 reads the data of M=64 bytes from the address of SA+(64×k) (MR(k)). In parallel with this, the encryption/decryption unit 114 performs the encryption of the data of the (k−1)-th 64 bytes read by the bus I/F unit 112 in the period Tk−1 (Encryption (k−1)). Further, in parallel with this, as a third processing, the CS unit 118 and the NI/F unit 109 perform the processings of CS and the transmission of the (k−2)-th data encrypted by the encryption/decryption unit 114 in the period Tk−1 (CS (k−2) and Transmission (k−2)). In the period Tn+1, the encryption/decryption unit 114 performs the encryption of the data of the n-th 64 bytes read by the bus I/F unit 112 in the period Tn (Encryption (n)). Further, in parallel with this, the CS unit 118 and the NI/F unit 109 perform the processings of CS and Transmission of the data of the (n−1)-th 64 bytes encrypted by the encryption/decryption unit 114 in the period Tn (CS (n−1) and Transmission (n)). In the period Tn+2, the CS unit 118 and the NI/F unit 109 perform the processing of CS and Transmission of the data of the n-th 64 bytes encrypted by the encryption/decryption unit 114 in the period Tn+1 (CS (n) and Transmission (n)). Thus, the pipeline processing is completed.

In this manner, by performing the processings of MR, Encryption, CS, and Transmission in parallel, a high speed transmission processing can be performed.

<DTCP-IP, IP Broadcasting Reception>

Next, in FIG. 9, in the similar basic configuration, the operation of the accelerator 106 in the data processing in the case of a DTCP-IP and IP broadcasting reception will be explained. In the case of the reception of DTCP-IP and the IP broadcasting, as an object data processing, first, the NI/F unit 109 receives the data from the network 190, and the data is stored in the reception buffer 108. Next, the decryption and the CS processing of the data are performed in parallel. After that, the decryption result data is written in the memory 103.

To allow the described operation to be performed, the present data processing apparatus 100 sets the registers (201 to 206, and 208) as follows. A reception, that is, the storage of the reception data into the reception buffer 108 is set to the first processing setting register 201. A combination of Decryption and CS is set to the second processing setting register 202. A write (MW) to the memory 103 is set to the third processing setting register 203. A data length for performing the first to third processings set to the registers (201 to 203) is set to the L setting register 204 as L. An initial address of the area storing the reception data of the reception buffer 108 is set to the SA setting register 205 as SA. An initial address of the area storing the decryption result of the reception data in the memory 103 is set to the DA setting register 206 as DA. Finally, together with the encryption/decryption processing type, a "start processing in register mode" code is set to the processing start setting register 208. Further, at this time, the control unit 110 starts the processing with taking the least common multiple of each processing unit of the processings of Encryption/Decryption and CS as a processing unit (M).

Further, the control unit 110, in order to follow the processing order set to registers (201 to 203), instructs the encryption/decryption unit input selector 115 to select the input from the reception buffer 108 and deliver it to the encryption/decryption unit 114. The control unit 110 instructs also the CS unit input selector 119 to select the input from the reception buffer 108 and deliver it to the CS unit 118. And, the control unit 110 also instructs the bus output data selector 113 to select the input from the encryption/decryption unit 114 and deliver it to the bus I/F unit 112.

In this manner, by taking the processing unit (M) as 64 bytes, and instructing each selector (113, 115, 117, and 120) to select the input/output of the processing data, the operation of the pipeline processing as shown in FIG. 9 is realized.

In the pipeline processing of FIG. 9, first, in the period T1, as a first processing, the NI/F unit 109 receives a first M=64 bytes and stores it in the reception buffer 108 (Reception (1)). In the period T2, in the same manner, the NI/F unit 109 receives a data of a second 64 bytes and delivers it to the encryption/decryption unit 114 and the CS unit 118 (reception (2)). In parallel with this, as a second processing, the encryption/decryption unit 114 and the CS unit 118 perform the decryption and the CS processing of the initial data received by the NI/F unit 109 in the period T1 (Decryption (1) and CS(1)). In the period Tk the NI/F unit 109 receives the k-th data (Reception (k)). In parallel with this, the encryption/decryption unit 114 and the CS unit 118 perform the decryption and the processing of CS of the data received by the NI/F unit 109 in the period Tk−1 (Decryption (k−1) and CS (k−1)). Further, in parallel with this, as a third processing, the data of the (k−2)-th 64 bytes decrypted by the encryption/decryption unit 114 in the period Tk−1 is written to the memory 103 by the bus I/F unit 112 (MW (k−2)). In the period Tn+1, the encryption/decryption unit 114 and the CS unit 118 perform the decryption and the CS processing of the n-th data received by the NI/F unit 109 in the period Tn (Decryption (n) and CS(n)). Further, in parallel with this, the data of the (n−1)-th 64 bytes decrypted by the encryption/decryption unit 114 in the period Tn is written to the memory 103 by the bus I/F unit 112 (MW (n−1)). In the period Tn+2, the CS processing result is confirmed, and at the same time, the data of the n-th 64 bytes decrypted by encryption/decryption unit 114 in the period (n−1) is written to the memory 103 by the bus I/F unit 112 (MW (n)). Thus, the pipeline processing is completed.

Thus, by performing the processings of Reception, Decryption, CS, and MW in parallel a high speed reception processing can be performed.

While the invention carried out by the present inventor has been specifically described based on the embodiment, it is to be understood that the present invention is not limited to the above described embodiment, and needless to mention, various changes and modifications may be made without departing from the spirit of the invention.

The present invention can be applicable to a processing relating to security such as an encryption/decryption and falsification detection of files, a communication protocol processing of the network and the like, a digital filter, an image processing, the compression and expansion processings of picture and voice, and the like.

What is claimed is:
1. A data processing apparatus comprising:
a central processing unit (CPU);
a memory unit;
an encryption/decryption processor constructed to perform
  an encryption and/or decryption type of data processing;

a message authentication (MA) processor constructed to perform a message authentication type of data processing; and a checksum processing (CS) unit constructed to perform a checksum type of data processing;

a bus interface (I/F) unit constructed to enable communication between the central processing unit (CPU) and/or the memory unit on one end, and the encryption/decryption processor and/or the message authentication processor and/or the checksum processor on the other end;

wherein the data processing apparatus is configured, in a predetermined data processing, to execute in parallel and/or sequentially at least two of the aforementioned types of data processing in their respective processors, and to subject the at least two of the aforementioned types of data processing to a pipeline processing in multiple divided periods;

wherein the data processing apparatus is configured to consolidate a plurality of overlapping data accesses into one access, for use in the predetermined data processing; and wherein the data processing apparatus is configured to determine a unified data processor (M) as a least common multiple of processing capacity, as measured in bytes, of the at least two of the encryption/decryption processor, the authentication processor, and the checksum processor.

2. The data processing apparatus according to claim 1, wherein the data processing apparatus is configured to determine the unified data processor (M) as the smallest quantity of data that can be processed by the at least two of the encryption/decryption processor, the message authentication processor, and the checksum processor.

3. The data processing apparatus according to claim 1, wherein the bus interface unit, the encryption/decryption processor, the message authentication processor, and the checksum processor are all disposed within a network data processing accelerator unit.

4. The data processing apparatus according to claim 3, further comprising:

an input device constructed to receive a user operation and/or data for the data processing apparatus;

an output device constructed to send notification information and/or data from the data processing apparatus;

a bus to connect the central processing unit (CPU), the memory, the input device, the output device, and the bus interface unit.

5. The data processing apparatus according to claim 4, further comprising:

a network interface (NI/F) unit configured to connect to a network;

a reception buffer unit constructed to connect the bus interface unit to the network interface (NI/F) unit, and constructed to temporarily store data received from the network;

a transmission buffer unit constructed to connect the network data processing accelerator unit to the network interface (NI/F) unit, and constructed to temporarily store data to be sent to the network from the network data processing accelerator unit.

6. The data processing apparatus according to claim 5, further comprising:

a transmission output data selector disposed in the network data processing accelerator unit, connected within the network data processing accelerator unit to the bus interface (I/F) unit, the encryption/decryption processor, the message authentication processor, and the checksum processor, connected to the transmission buffer disposed outside the network data processing accelerator unit, and constructed to select output data to be transmitted to the network.

7. The data processing apparatus according to claim 5, further comprising:

a bus output data selector constructed to select data to be inputted to the bus interface (I/F) unit, and/or data to be outputted to the memory and/or the output device through the bus interface (I/F) unit, the data to be received from any of: the reception buffer, the encryption/decryption unit, the message authentication (MA) processor, and the checksum processing (CS) unit.

8. The data processing apparatus according to claim 5, further comprising:

a control unit disposed within the network data processing accelerator unit, constructed to receive instructions from the central processing unit (CPU) through the bus, and constructed to determine an operation for any of the other components of the network data processing accelerator unit; and a control bus constructed to transmit instructions from the control unit to any of the other components of the network data processing accelerator unit.

* * * * *